(12) United States Patent
Apelsmeier et al.

(10) Patent No.: US 10,184,385 B2
(45) Date of Patent: Jan. 22, 2019

(54) METHOD AND SYSTEM FOR OPERATING A MOTOR VEHICLE

(71) Applicant: AUDI AG, Ingolstadt (DE)

(72) Inventors: Andreas Apelsmeier, Pollenfeld (DE); Guenter Vetter, Burladingen (DE)

(73) Assignee: AUDI AG, Ingolstadt (DE)

( * ) Notice: Subject to any disclaimer, the term of this patent is extended or adjusted under 35 U.S.C. 154(b) by 54 days.

(21) Appl. No.: 15/446,572

(22) Filed: Mar. 1, 2017

(65) Prior Publication Data
US 2017/0254256 A1 Sep. 7, 2017

(30) Foreign Application Priority Data

Mar. 2, 2016 (DE) .......................... 10 2016 002 518

(51) Int. Cl.
*F01P 7/16* (2006.01)
*F01P 3/20* (2006.01)
(Continued)

(52) U.S. Cl.
CPC .............. *F01P 7/167* (2013.01); *B60K 11/02* (2013.01); *B60W 20/00* (2013.01); *F01P 3/20* (2013.01); *F01P 5/10* (2013.01); *B60W 2710/0688* (2013.01); *B60W 2710/088* (2013.01); *B60Y 2200/92* (2013.01); *B60Y 2306/05* (2013.01);
(Continued)

(58) Field of Classification Search
CPC ...... F01P 7/167; F01P 5/10; F01P 3/20; F01P 2050/24; B60W 20/00; B60W 2710/0688; B60W 2710/088; B60K 11/02; Y10S 903/903; B60Y 2306/05; B60Y 2200/92
See application file for complete search history.

(56) References Cited

U.S. PATENT DOCUMENTS 7,635,040 B2 * 12/2009 Seo .................... B60H 1/00278
180/68.1
8,215,427 B2 * 7/2012 Rouaud .................... B60K 6/26
180/65.27
(Continued)

FOREIGN PATENT DOCUMENTS

DE 11 2011 104 043 9/2013
DE 10 2012 217 101 A1 6/2014
(Continued)

OTHER PUBLICATIONS

European Search Report dated Jul. 25, 2017 by the European Patent Office in European Application No. EP 17 15 7033.
(Continued)

*Primary Examiner* — Joseph Dallo
(74) *Attorney, Agent, or Firm* — Henry M. Feiereisen LLC

(57) ABSTRACT

A motor vehicle can be powered by a combustion engine or an electric machine or both. Coolant is conveyed in the coolant circuit first to the electric machine before being conveyed from the electric machine to the combustion engine for cooling both the combustion engine and the electric machine. A cooling device adjusts a temperature of the coolant in the coolant circuit in such a way that the cooling device adjusts the coolant to a first temperature, when the motor vehicle is powered by the combustion engine, and to a second temperature which is less than the first temperature, when the motor vehicle is powered by the electric machine and the combustion engine.

7 Claims, 1 Drawing Sheet

(51) Int. Cl.
  *B60K 11/02* (2006.01)
  *B60W 20/00* (2016.01)
  *F01P 5/10* (2006.01)

(52) U.S. Cl.
  CPC ....... *F01P 2050/24* (2013.01); *Y10S 903/903* (2013.01)

(56) References Cited

U.S. PATENT DOCUMENTS

| | | | | |
|---|---|---|---|---|
| 8,281,884 B2 * | 10/2012 | Cimatti | .................... | B60K 6/40 |
| | | | | 165/42 |
| 8,556,011 B2 * | 10/2013 | Anwar | .................... | B60L 3/12 |
| | | | | 180/65.275 |
| 8,608,521 B1 * | 12/2013 | Snyder | .................... | B63H 21/22 |
| | | | | 440/1 |
| 8,682,516 B1 * | 3/2014 | Balogh | .................... | B63H 23/30 |
| | | | | 318/588 |
| 8,725,329 B1 * | 5/2014 | Snyder | .................... | B63H 20/14 |
| | | | | 440/1 |
| 8,762,022 B1 * | 6/2014 | Arbuckle | .................... | F02D 9/02 |
| | | | | 114/102.1 |
| 8,808,139 B1 * | 8/2014 | Arbuckle | .................... | B60W 10/02 |
| | | | | 477/5 |
| 8,978,395 B2 * | 3/2015 | Creviston | .................... | B60H 1/00271 |
| | | | | 62/79 |
| 8,992,274 B1 * | 3/2015 | Ward | .................... | B63H 21/20 |
| | | | | 440/1 |
| 9,054,555 B1 * | 6/2015 | Ward | .................... | H02J 7/14 |
| 9,199,531 B2 * | 12/2015 | Hutchins | .................... | B60K 6/48 |
| 9,216,882 B2 * | 12/2015 | Nakazawa | .................... | B66F 9/075 |
| 9,415,766 B2 * | 8/2016 | Ikedaya | .................... | B60W 20/14 |
| 9,533,747 B2 * | 1/2017 | Arbuckle | .................... | B63H 21/20 |
| 9,956,881 B2 * | 5/2018 | Anderson | .................... | B60L 11/02 |
| 2004/0163861 A1 | 8/2004 | Fukuda et al. | | |
| 2015/0094893 A1 | 4/2015 | Hopkirk | | |

FOREIGN PATENT DOCUMENTS

| | | |
|---|---|---|
| DE | 112014003408 T5 | 4/2016 |
| EP | 1 197 644 | 4/2002 |
| EP | 2450217 A1 | 5/2012 |
| FR | 2991924 A1 | 12/2012 |
| GB | 2500205 A | 9/2013 |

OTHER PUBLICATIONS

English translation of European Search Report dated Jul. 25, 2017 by the European Patent Office in European Application No. EP 17 15 7033.

* cited by examiner

METHOD AND SYSTEM FOR OPERATING A MOTOR VEHICLE

CROSS-REFERENCES TO RELATED APPLICATIONS

This application claims the priority of German Patent Application, Serial No. 10 2016 002 518.2, filed Mar. 2, 2016, pursuant to 35 U.S.C. 119(a)-(d), the disclosure of which is incorporated herein by reference in its entirety as if fully set forth herein.

BACKGROUND OF THE INVENTION

The present invention relates to a method and system for operating a motor vehicle.

It would be desirable and advantageous to provide an improved method and system for operating a motor vehicle to obviate prior art shortcomings.

SUMMARY OF THE INVENTION

According to one aspect of the present invention, a method includes operating a motor vehicle by at least one of a combustion engine and an electric machine, conveying coolant in a common coolant circuit first to the electric machine before being conveyed from the electric machine to the combustion engine for cooling both the combustion engine and the electric machine, and adjusting a temperature of the coolant by a cooling device in the coolant circuit in such a way that the cooling device adjusts the coolant to a first temperature, when the motor vehicle is powered solely by the combustion engine, and to a second temperature which is less than the first temperature, when the motor vehicle is powered by the electric machine and the combustion engine.

According to another advantageous feature of the present invention, a power electronics can be operated by the electric machine which is operably connected to the power electronics. Advantageously, the electric machine can be connected downstream of the power electronics, and coolant can be conveyed first to the power electronics and then from the power electronics to the electric machine. Thus, the power electronics is operated together with the electric machine, with coolant for cooling the power electronics being adjusted to a same temperature as the temperature to cool the electric machine.

According to another aspect of the present invention, a system for operating a motor vehicle includes an electric machine, a combustion engine arranged downstream of the electric machine, a common coolant circuit for cooling both the combustion engine and the electric machine, the common coolant circuit being configured to first convey coolant to the electric machine before being conveyed from the electric machine to the combustion engine, and a cooling device disposed in the coolant circuit to adjust a temperature of the coolant in the coolant circuit in such a way that the cooling device adjusts the coolant to a first temperature, when the motor vehicle is powered solely by the combustion engine, and to a second temperature which is less than the first temperature, when the motor vehicle is powered by the electric machine and the combustion engine.

According to another advantageous feature of the present invention, the combustion engine and the electric machine can be connected successively in the coolant circuit via a duct extending between the combustion engine and the electric machine.

According to another advantageous feature of the present invention, a power electronics can be operated by the electric machine which is operably connected to the power electronics.

According to still another aspect of the present invention, a cooling system for a motor vehicle includes a coolant circuit for cooling an electric machine and a combustion engine arranged downstream of the electric machine, the coolant circuit being configured to first convey coolant to the electric machine before being conveyed from the electric machine to the combustion engine, and a cooling device disposed in the coolant circuit to adjust a temperature of the coolant in the coolant circuit in such a way that the cooling device adjusts the coolant to a first temperature, when the motor vehicle is powered solely by the combustion engine, and to a second temperature which is less than the first temperature, when the motor vehicle is powered by the electric machine and the combustion engine.

In accordance with the present invention, provision is made for a common coolant circuit for the combustion engine and the high-voltage components of the motor vehicle, i.e. electric machine and power electronics, and for a lowering of the coolant temperature in order to cool the combustion engine. When the motor vehicle, normally a hybrid vehicle, is powered solely by the electric machine, the coolant temperature is reduced compared to a hybrid operating mode, in which both electric machine and combustion engine operate, because cooling is required only of the electric machine and the power electronics. Yet, a required power density of the these electronic drive components is still reached.

When the motor vehicle is powered solely by the combustion engine, the coolant temperature is increased compared to the hybrid operating mode.

When the motor vehicle is powered in the hybrid operating mode, with both combustion engine and electric machine with its power electronics being active, the coolant is adjusted to the second temperature which is less than the first temperature which is set when the motor vehicle is powered only by the combustion engine. Still, the second temperature is higher than a third temperature, which is set when the motor vehicle is solely powered by the electric machine.

The hybrid operating mode generates a torque or power of the combustion engine and the electric machine for powering the motor vehicle, whereby there is no need for the electric machine with the power electronics to operate with full power and can be operated even at a higher temperature.

Both, the combustion engine and the electric machine can be cooled by a common coolant circuit. Moreover, a coolant temperature is lowered for the combustion engine. Any possible deterioration of $CO_2$ emissions of the combustion engine is compensated by the hybrid drive, comprised of the combustion engine and the electric machine. Cooling of the electric machine enables an increase of capacity of a battery and an increase in range of the electric machine. When the motor vehicle is powered solely by the electric machine, the temperature of coolant is adjusted to the third temperature which is less than the second temperature and thus also less than the first temperature. It is hereby possible to attain a demanded power density for the electric machine and associated power electronics as electric components for powering the motor vehicle. In the hybrid operating mode, the temperature of the coolant is adjusted from the third temperature to the second temperature and thus raised, with the combustion engine also being cooled in this case. A torque and/or power of the overall drive is/are provided in this case via the combustion engine, the electric machine and the associated power electronics. The latter two electronic components need not operate at full power, even when the temperature is excessive.

In the event, the motor vehicle requires a momentary boost and thus a momentary increase in power, e.g. during acceleration, provision is made for the electric machine to briefly operate with full power. When implementing the method according to the present invention, in which the temperature of coolant in the coolant circuit is adjusted in dependence on which machine is used for powering the motor vehicle, adjustment of the temperature of the coolant is realized with consideration of a $CO_2$ balance.

Since the motor vehicle has a single coolant circuit for cooling both the combustion engine and the electric machine, installation space and mass of the cooling device can be saved.

For example, the coolant for cooling the combustion engine can be adjusted to a temperature (first temperature) of 95° C. It is further possible to lower the temperature of the coolant to about 40° C. However, the temperature of the coolant has an impact on the emission of exhaust and $CO_2$ of the combustion engine, so adjustment of the temperature requires consideration of the overall system and motor vehicle. For example, the temperature may be adjusted to about 70° C.

BRIEF DESCRIPTION OF THE DRAWING

Other features and advantages of the present invention will be more readily apparent upon reading the following description of currently preferred exemplified embodiments of the invention with reference to the accompanying drawing, in which the sole

DETAILED DESCRIPTION OF PREFERRED EMBODIMENTS

Figure 1:
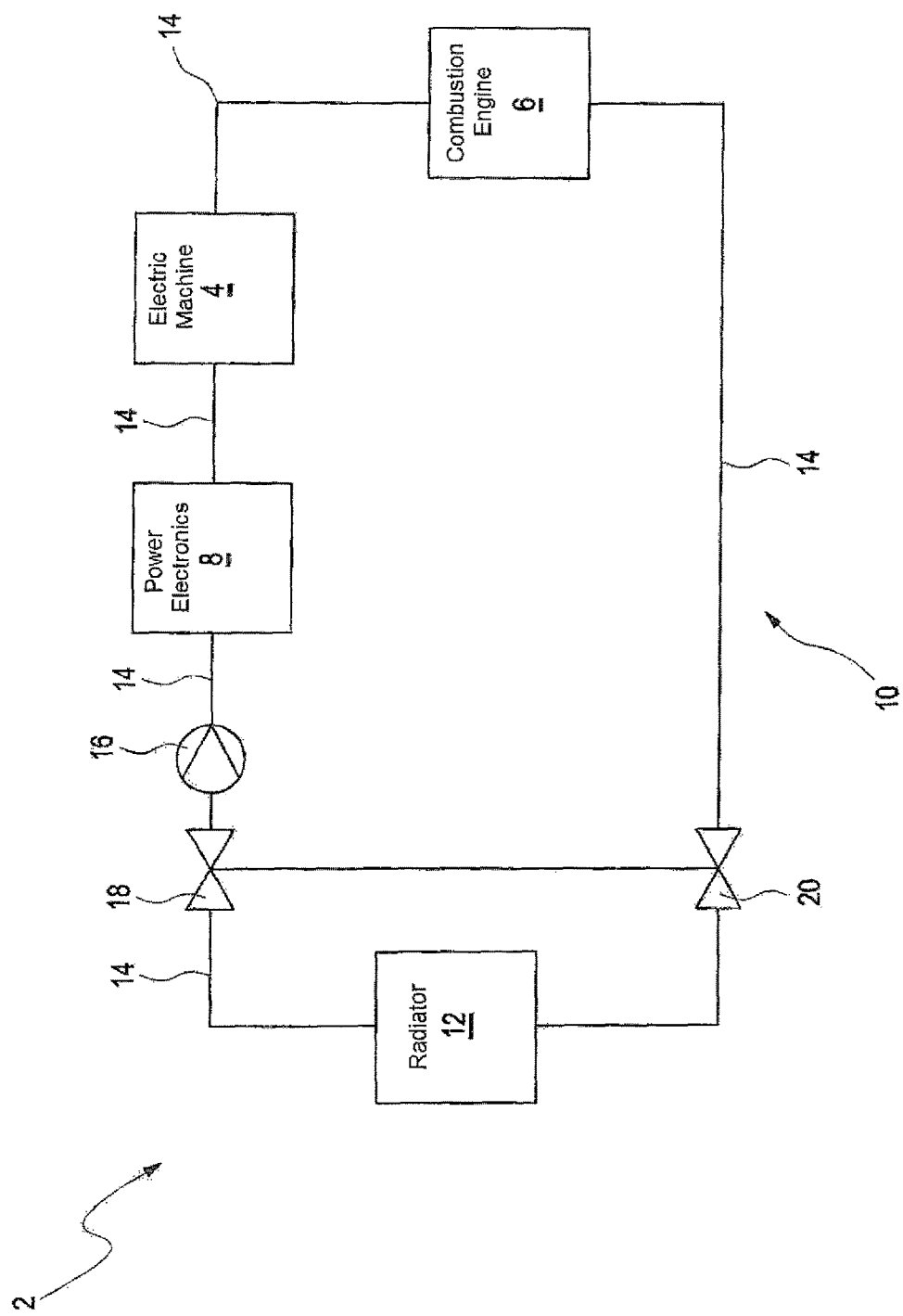
FIG. 1 is a schematic representation of a system according to the present invention.

The depicted embodiment is to be understood as illustrative of the invention and not as limiting in any way. It should also be understood that the figure may not necessarily be to scale. In certain instances, details which are not necessary for an understanding of the present invention or which render other details difficult to perceive may have been omitted.

Turning now to FIG. 1, there is shown a schematic representation of a system according to the present invention, generally designated by reference numeral 2, for powering a motor vehicle. The system 2 represents hereby a component of the motor vehicle and includes an electric machine 4 and a combustion engine 6 which can be used individually or jointly to power the motor vehicle. The electric machine 4 is operably connected to a power electronics 8 which is active, whenever the electric machine 4 is in operation.

The motor vehicle can be powered solely by the electric machine 4, or solely by the combustion engine 8, or in a hybrid operating mode in which both the electric machine 4 and the combustion engine 6 are operated to power the motor vehicle.

The system 2 includes a common single coolant circuit 10 to cool the electric machine 4 with associated power electronics 8 and the combustion engine 6. The coolant circuit 10 includes a cooling device 12 (or radiator) configured to adjust a temperature of coolant circulating in the coolant circuit 10. Moreover, the coolant circuit 10 includes a duct system with several ducts 14 via which coolant flows to the combustion engine 6 and the electric machine 4 with associated power electronics 8 and is conveyed by a pump 16 in the coolant circuit 10. The pump 16 is hereby positioned at a location upstream of the power electronics 8, with the electric machine 4 being arranged downstream of the power electronics 8 and with the combustion engine 6 being arranged downstream of the electric machine 4. The individual components are hereby connected by respective ducts 14 of the duct system.

The power electronics 8, the electric machine 4 and the combustion engine 6 are connected directly behind one another in a row in the coolant circuit 10 which further includes a valve 18 and a valve 20 which open and close in dependence on demand. When both valves 18, 20 are closed, the cooling device 12 is separated from the power electronics 8, the electric machine 4 and the combustion engine 6, so that no cooling takes place for these components. When the valves 18, 20 are both open, coolant, cooled by the cooling device 12, can be conveyed by the pump 16 through the ducts 14 of the coolant circuit 10 sequentially to the power electronics 8, the electric machine 4 and the combustion engine 6.

Thus, when the coolant circuit 10 is operated, coolant, cooled by the cooling device 12, is forced by and/or via the pump 16 to flow first to the power electronics 8, then to the electric machine 4, and then to the combustion engine 6.

When the motor vehicle is powered solely by the combustion engine 6, coolant is adjusted to a first temperature, whereas in a situation when the motor vehicle is powered by both the electric machine 4 and the combustion engine 6, coolant is adjusted to a second temperature which is less than the first temperature. When the motor vehicle is powered solely by the electric machine 4, coolant is adjusted to a third temperature which is less than the second temperature.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:
1. A method, comprising:
operating a motor vehicle by at least one of a combustion engine and an electric machine;
conveying coolant from a cooling device in a common coolant circuit consecutively to a single power electronics, then from the power electronics to the electric machine, then from the electric machine to the combustion engine for cooling the power electronics, the combustion engine and the electric machine;
adjusting a temperature of the coolant by the cooling device in the coolant circuit in such a way that the cooling device adjusts the coolant to a first temperature, when the motor vehicle is powered solely by the combustion engine, and to a second temperature which is less than the first temperature, when the motor vehicle is powered by the electric machine and the combustion engine; and operating the power electronics by the electric machine.

2. The method of claim 1, further comprising adjusting the coolant to a third temperature which is less than the second temperature, when the motor vehicle is powered solely by the electric machine.

3. A system for operating a motor vehicle, said system comprising:
- a cooling device;
- a single power electronics;
- an electric machine arranged downstream of the power electronics;
- a combustion engine arranged downstream of the electric machine;
- a common coolant circuit for cooling the power electronics, the combustion engine and the electric machine, said common coolant circuit being configured to convey coolant consecutively from the cooling device to the power electronics, then from the power electronics to the electric machine, and then from the electric machine to the combustion engine;
- a cooling device disposed in the coolant circuit to adjust a temperature of the coolant in the coolant circuit in such a way that the cooling device adjusts the coolant to a first temperature, when the motor vehicle is powered solely by the combustion engine, and to a second temperature which is less than the first temperature, when the motor vehicle is powered by the electric machine and the combustion engine,
- wherein the power electronics is operated by the electric machine.

4. The system of claim 3, wherein the combustion engine and the electric machine are connected successively in the coolant circuit via a duct extending between the combustion engine and the electric machine.

5. The system of claim 3, wherein the cooling device adjusts the coolant to a third temperature which is less than the second temperature, when the motor vehicle is powered solely by the electric machine.

6. A cooling system for a motor vehicle, said cooling system comprising:
- a coolant circuit for cooling a power electronics, an electric machine arranged downstream of the power electronics, and a combustion engine arranged downstream of the electric machine, said coolant circuit being configured to convey coolant consecutively to the power electronics, then from the single power electronics to the electric machine, and then from the electric machine to the combustion engine; and
- a cooling device disposed in the coolant circuit to adjust a temperature of the coolant in the coolant circuit in such a way that the cooling device adjusts the coolant to a first temperature, when the motor vehicle is powered solely by the combustion engine, and to a second temperature which is less than the first temperature, when the motor vehicle is powered by the electric machine and the combustion engine.

7. The cooling system of claim 6, wherein the cooling device adjusts the coolant to a third temperature which is less than the second temperature, when the motor vehicle is powered solely by the electric machine.

* * * * *